J. E. W. FILLET.
ANCHORING DEVICE FOR AGRICULTURAL TRACTORS OR THE LIKE.
APPLICATION FILED APR. 6, 1908.
901,799.  Patented Oct. 20, 1908.
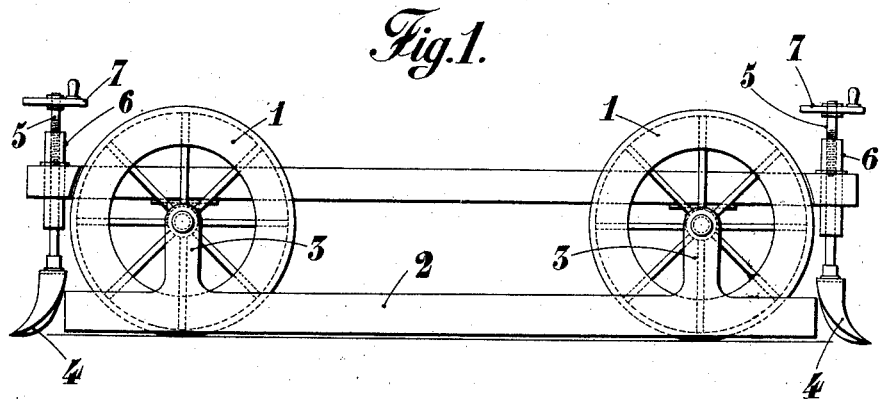
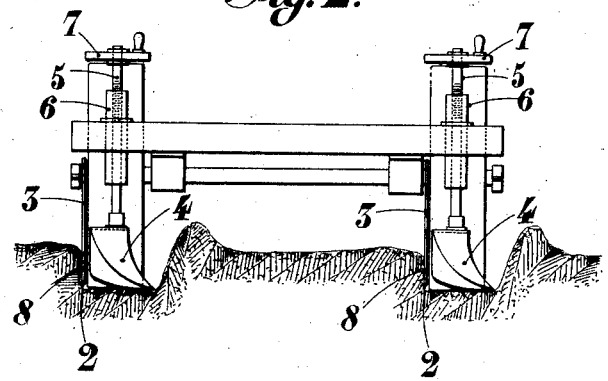
Witnesses
Inventor
Joseph E. W. Fillet
By James L. Norris

UNITED STATES PATENT OFFICE.

JOSEPH EUGÈNE WILLIAM FILLET, OF PARIS, FRANCE.

ANCHORING DEVICE FOR AGRICULTURAL TRACTORS OR THE LIKE.

No. 901,799.  Specification of Letters Patent.  Patented Oct. 20, 1908.

Application filed April 6, 1908. Serial No. 425,503.

*To all whom it may concern:*

Be it known that I, JOSEPH EUGÈNE WILLIAM FILLET, subject of the Queen of the Netherlands, residing at Paris, Department of the Seine, in France, have invented certain new and useful Improvements in Anchoring Devices for Agricultural Tractors or the Like, of which the following is a specification.

This invention relates to new and useful improvements in anchoring devices for tractors, which devices serve to prevent the tractors from skidding under side draft.

The invention aims, as a primary object, to provide anchoring devices for the above purpose, which devices serve also as rut or track formers for the wheels and are of novel construction and assemblage.

The above and other objects will appear in the course of the following description in which reference is had to the accompanying drawings wherein:—

Figure 1 shows a diagrammatic view of the tractor in side elevation, and Fig. 2 is an end view, each of the ends being the same.

Similar numerals of reference are used to denote corresponding parts throughout the views.

The wheels of the tractor are provided with iron sheet flanges 1 having same center and diameter as the rim, their width being about 25 centimeters or more.

2 is a plate, the height of which is about the same as the width of the flange 1; it is fixed to the hubs by means of brackets 3. Before each of the front wheels a special plow-share 4, or other suitable rut forming device is secured at the lower end of a bar 5 which is threaded in a casing 6 solid with the frame of the tractor the bar 5 being adjustable vertically of said casing by virtue of its threaded engagement therein; thus, the height of the plow-share may be adjusted with the hand-wheel 7. Such a device may be mounted in the rear part of each of the hind wheels in order to anchor the tractor after a rearward displacement of it.

When the plow-share is brought in a proper position, the displacement of the tractor effects a rut-like furrow in which the wheels penetrate; the flange 1 of the wheels and the plates 2 apply against the side 8 of the furrow and offset the lateral draft which, without this device would cause the tractor to skid.

The plow-share 4 automatically cuts the ground, making thus a rut, when the tractor runs perpendicularly to the direction of plowing; anchoring is thus maintained during the entire operation and prevents every waste of time.

The greatest efficiency of this device is obtained by securing the anchoring plates 2, on the side where the pull is exerted; the point of application of the force being as low as possible in order to prevent the tractor from turning down. This anchoring device may be used with steam, electric, or explosive engine tractors, as well as with the return-pulley trucks; it allows the perfect running of light tractors, easily movable, able to travel where heavy tractors would sink.

Having thus described and ascertained the nature of my invention and in what manner the same may be performed, I declare that what I claim is:

1. In an anchoring device for tractors, in combination, tractor wheels, means located in advance of each wheel for forming a furrow in the ground, the wheels traveling in the furrows thus formed, and means carried by the tractor and bearing against corresponding sides of the furrows, for offsetting side draft.

2. In an anchoring device for tractors, in combination, tractor wheels, means located in advance of each wheel for forming a furrow in the ground, the wheels traveling in the furrows thus formed, and plates carried by the tractor adjacent the wheels and bearing against corresponding sides of the furrows for offsetting side draft.

In testimony whereof I have hereunto set my hand in presence of two subscribing witnesses.

JOSEPH EUGÈNE WILLIAM FILLET.

Witnesses:
EMILE KLOTZ,
HANSON C. COXE.